G. C. TOWLE.
CAR TRUCK.
APPLICATION FILED SEPT. 3, 1912.

1,074,479.

Patented Sept. 30, 1913.

2 SHEETS—SHEET 1.

Witnesses
W. Seibler
M. Galloway

Inventor
Geo. C. Towle
By R. J. McCarty
his Attorney

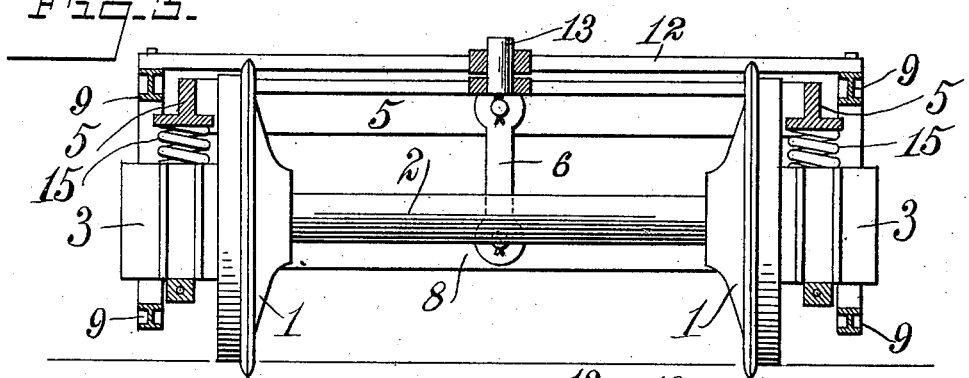
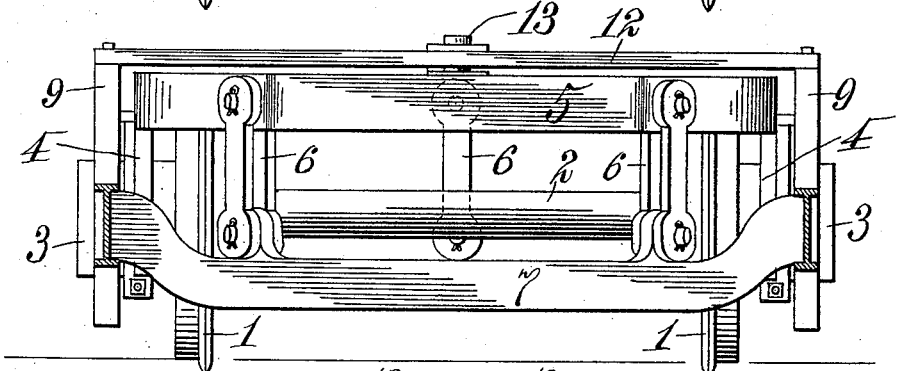
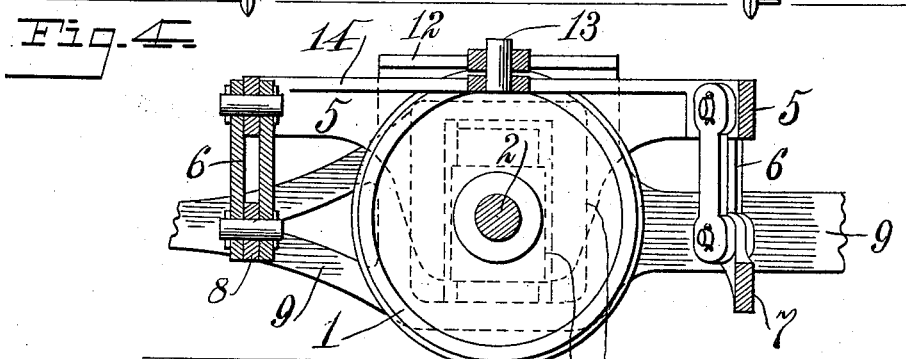

UNITED STATES PATENT OFFICE.

GEORGE C. TOWLE, OF DAYTON, OHIO.

CAR-TRUCK.

1,074,479.   Specification of Letters Patent.   Patented Sept. 30, 1913.

Application filed September 3, 1912. Serial No. 718,241.

*To all whom it may concern:*

Be it known that I, GEORGE C. TOWLE, a citizen of the United States, residing at Dayton, in the county of Montgomery and State of Ohio, have invented certain new and useful Improvements in Car-Trucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in non-parallel axle car trucks.

The object of the invention is to provide a truck of this type in which the wheels are enabled to easily adjust themselves to the various curvatures of a track, thereby maintaining the axles in parallel positions when the truck is running on a straight stretch of track, and preventing any excessive lateral or swaying movement of the car.

Another object of the invention is to provide a device of this type in which the weight of the main frame exerts an influence tending to move the wheels and axle to a normal position.

To the above ends, the truck is simple in construction and efficient in operation, as will hereinafter more fully appear from the following description.

Figure 1:
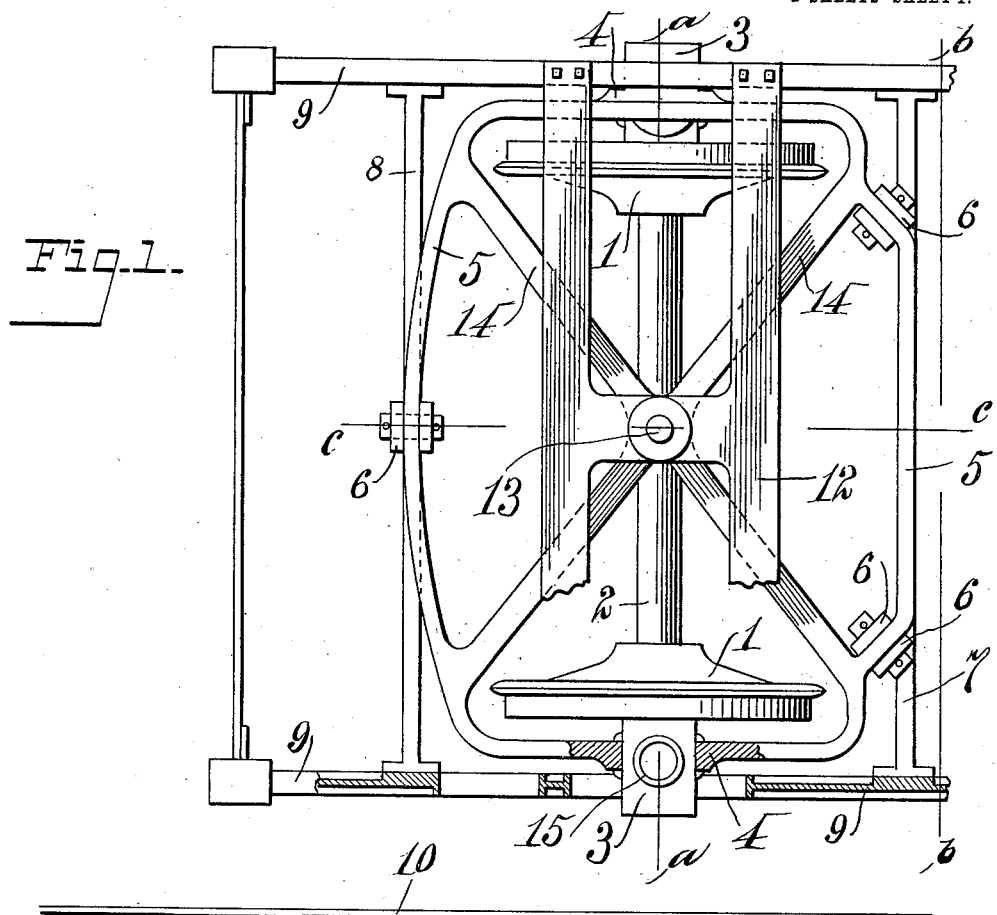
Figure 2:
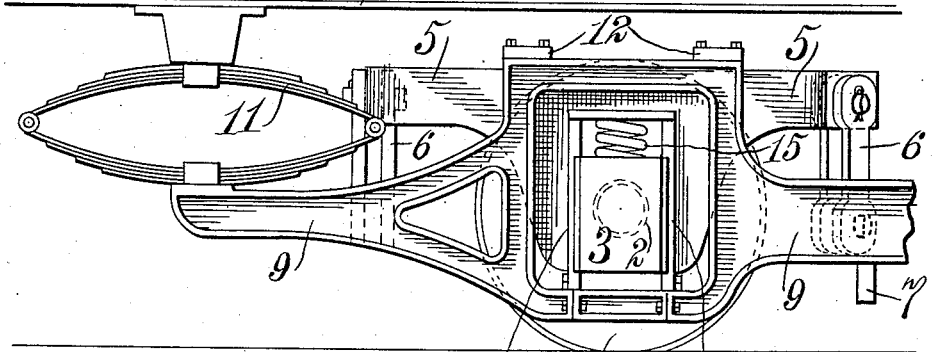

Referring to the accompanying drawings, Figure 1 is a top plan view of one end of the truck, it being understood that both ends are identical; Fig. 2 is a side elevation of the same; Fig. 3 is a section on the line 2—2 of Fig. 1; Fig. 4 is a section on the line *b—b* of Fig. 1; and Fig. 5 is a section on the line *c—c* of Fig. 1.

In the specification and drawings, similar reference characters indicate corresponding parts.

Referring more particularly to the drawings, 1—1 represent the wheels of a truck, the same being mounted on axles 2. The ends of the axles have bearings in journal boxes 3 which are mounted in guides 4 extending from sub-frames 5. Mounted between the journal boxes 3 and the sub-frames 5 are the usual springs 15 which are instrumental in absorbing shocks when the truck is passing over any unevenness in the track. Pivotally attached at their upper ends to each of the sub-frames 5 are three sets of links 6 which are also pivotally attached at their lower ends to cross members 7 and 8. The cross members 7 and 8 are attached to side longitudinal members 9 thereby forming the main frame of the truck. Extending in a well known manner above the side members 9, are rails 10 upon which the car body is mounted, and springs 11 (only one of which is shown) are mounted between the main frame and the rails. Mounted on the side members 9 are cross frames 12 which receive pivots 13. The pivots 13 are secured to spiders 14 attached to and forming a part of the sub-frames 5. Said pivots 13, it will be observed, are mounted along the longitudinal axis of the car and directly above and in vertical alinement with the axles, thereby permitting the sub-frames to be easily moved when the car is rounding a curve. The axes of the pivots of the links 6 are radial to the pivots 13 thus permitting the sub-frames and the wheels to swing on said pivots. The car body and the main frame of the truck are suspended from the sub-frames 5 by the links 6, and as there are three sets of these links for each frame 5, a three point suspension is provided which prevents the car body rocking laterally relative to the sub-frames. When the car is running on a straight stretch of track, the axles stand at right angles to the track, and when the wheels enter a curve, the contact between the wheels and track will move the axles to positions approximately radial with the curvature of the track. The truck may, therefore, be made of considerable length and still negotiate curves of comparatively small radii. The links 6, normally lie in true vertical positions, and when the wheels strike a curve, said links are thrown at an angle, and the upper pivots will describe arcs of circles, thereby shortening the distance between the main frame and the sub-frames. This movement of the links 6 will lift the car body and main frame of the truck owing to the main frame and car body being suspended by the links 6 from the sub-frames 5. The weight of the car and truck will, therefore, exert a tendency to move the axles back to their normal positions, and will maintain said axles in said positions when the car is running on a straight stretch of track. Owing to the pivots 13 being mounted directly above the axles 2, the said pivots will prevent lateral movement between the subframes 5 and the main frame. The car, therefore, will not be subject to lateral or swaying movements.

While in the drawings, I have shown the links in duplicate, I do not wish to limit myself to this exact construction, because said links may be provided singly; neither do I wish to limit myself to other unessential details of construction shown and described, as the device may be varied considerably without departing from the spirit of the invention, or the scope of the claims.

Having described my invention, I claim,

1. In a car truck, a main frame, a subframe including wheels and an axle, pivotally attached to said main frame, said main and sub-frames being vertically movable relative to each other, links connecting said main and sub-frame, whereby, when the sub-frame is swung on the pivot, the weight of the main frame will exert an influence to move said sub-frame to a normal position.

2. In a car truck, a main frame, a subframe including the wheels and axle, pivotally attached to said main frame, said pivot being in vertical alinement with the axle of the truck, said main and sub-frame being movable relative to each other, links constituting a three point suspension connecting said main and sub-frames, whereby, when the sub-frame is swung on the pivot, the weight of the main frame will exert an influence tending to move said sub-frame to a normal position.

3. In a car truck, a main frame, a cross-frame mounted on said main frame, a sub-frame, a spider attached to said sub-frame, said cross-frame and said spider being pivotally connected, said main frame and said sub-frame being vertically movable relative to each other; said pivot being in vertical alinement with the axle of the truck, and links constituting a three point suspension connecting said main frame and sub-frame, whereby, when the sub-frame is swung on the pivot, the weight of the main frame will exert an influence tending to move said sub-frame to a normal position.

In testimony whereof I affix my signature, in presence of two witnesses.

GEORGE C. TOWLE.

Witnesses:
R. J. McCarty,
Matthew Siebler.

---

Copies of this patent may be obtained for five cents each, by addressing the "Commissioner of Patents, Washington, D. C."